March 1, 1932. J. P. FERRIS 1,848,006
HYDRAULIC TRANSMISSION
Filed Aug. 4, 1930    3 Sheets-Sheet 2
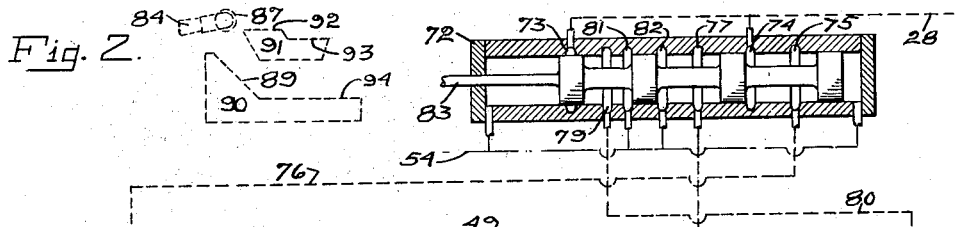
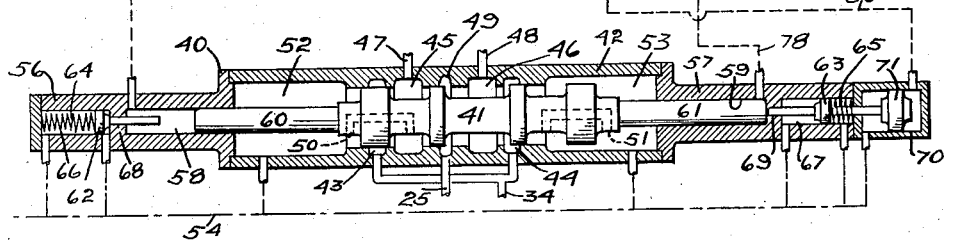
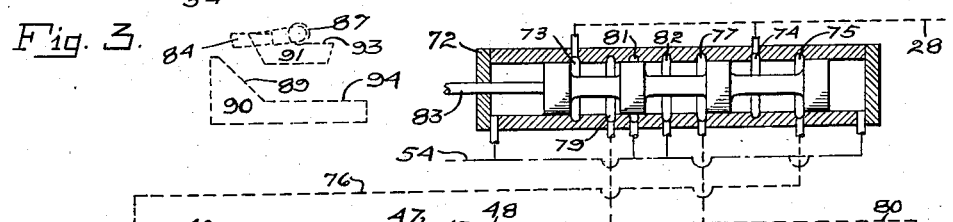
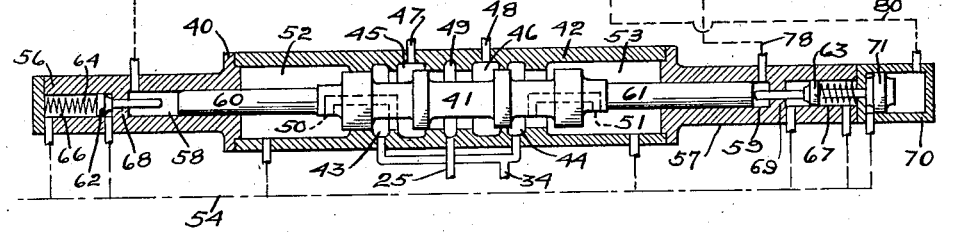
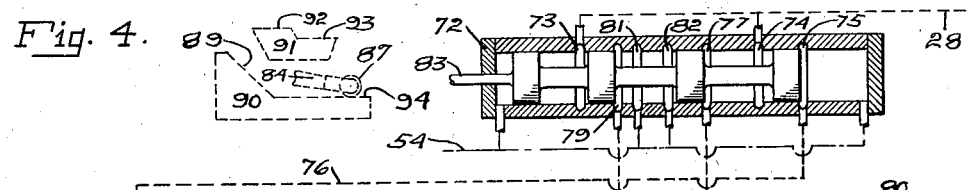
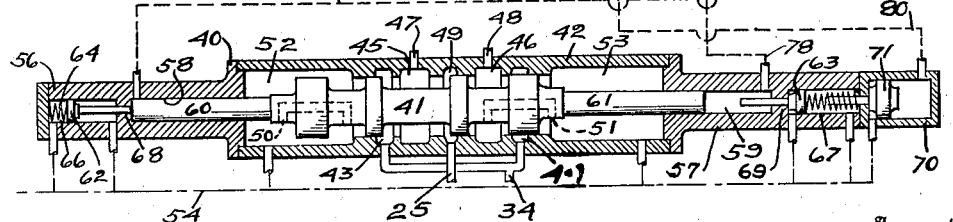
Inventor
JOHN P. FERRIS.
By Wesley P. Merrill
Attorney

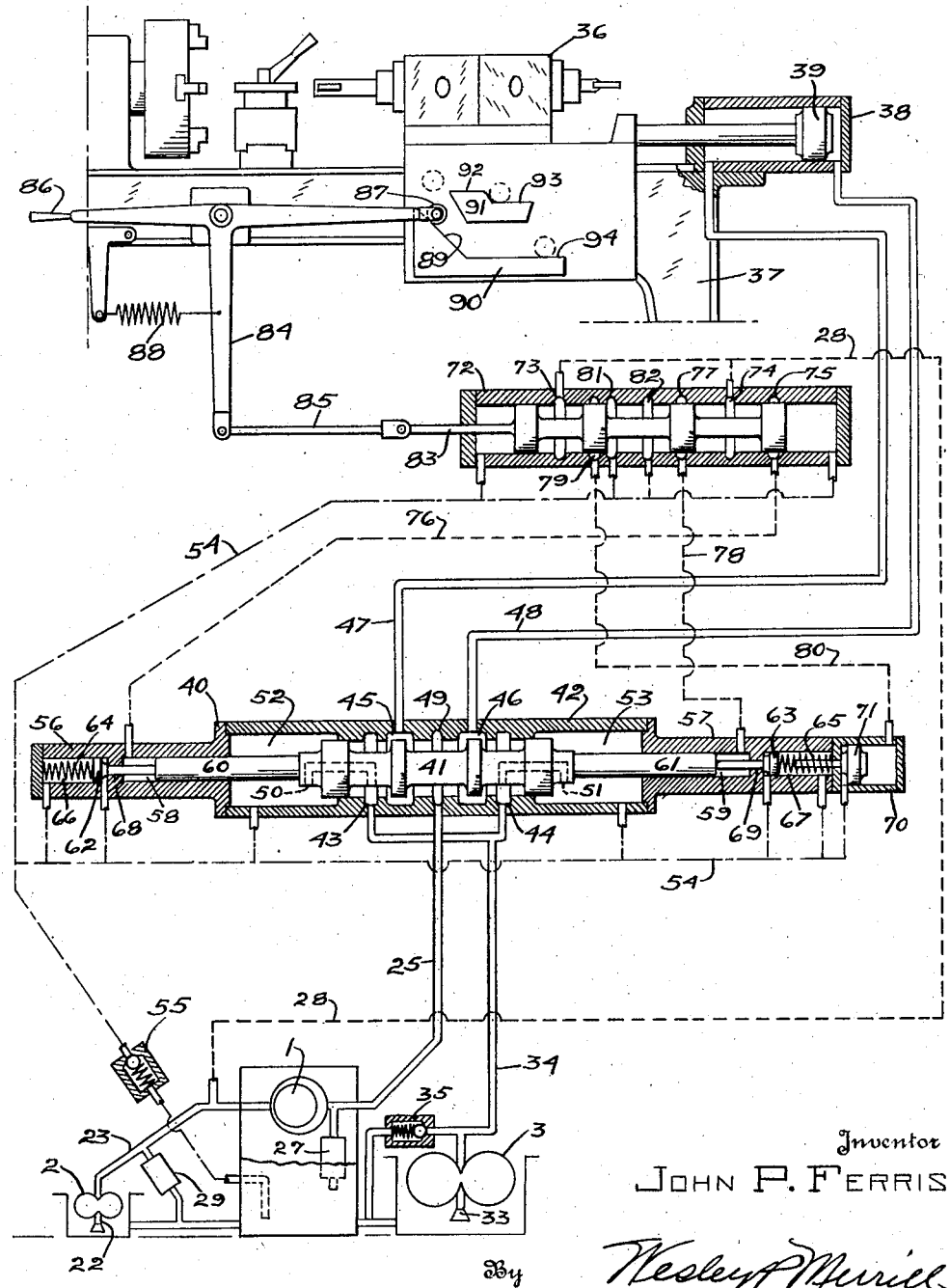

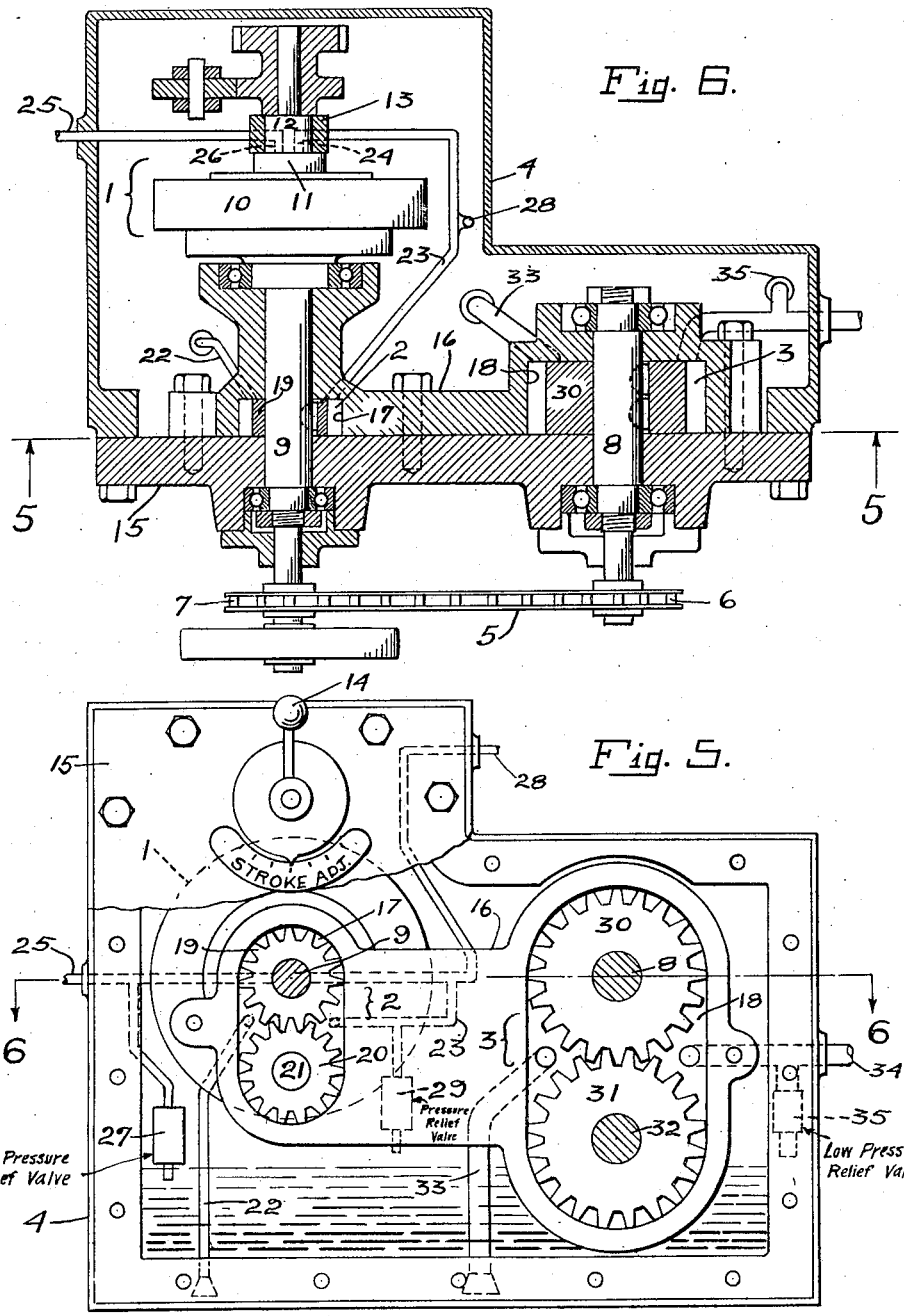

Patented Mar. 1, 1932

1,848,006

UNITED STATES PATENT OFFICE

JOHN P. FERRIS, OF WHITEFISH BAY, WISCONSIN, ASSIGNOR TO OILGEAR COMPANY, OF MILWAUKEE, WISCONSIN, A CORPORATION OF WISCONSIN

HYDRAULIC TRANSMISSION

Application filed August 4, 1930. Serial No. 473,032.

This invention relates to hydraulic transmissions for machine tools and the like and is particularly adapted to machines having a carriage which is to be advanced and retracted at various speeds, such as a tool carriage of a lathe.

The tool carriage is ordinarily advanced at high speed until the tool is about to engage the work, then advanced at a pre-determined feeding rate until the tool completes its operation, and then retracted at high speed.

The transmission to which the invention applies in particular has a hydraulic motor for operating the carriage, a feed pump for supplying liquid to the motor to operate it at the feeding rate, and a gear pump for supplying liquid for either supercharging the feed pump or for control purposes, or for both.

The gear pump ordinarily has a larger capacity than the feed pump and its output is usually employed for operating the motor at rapid traverse speeds in addition to one or both of the functions mentioned above.

When the gear pump is not delivering its full output to the motor, the excess liquid delivered by it is exhausted through a relief valve which has the required resistance to maintain a predetermined pressure in the gear pump circuit and, when the machine is idle, substantially the entire output of the gear pump is exhausted through this relief valve.

The liquid forced through the relief valve becomes heated and, if the rate of flow through the relief valve is high, the heat generated cannot be dissipated rapidly enough to prevent the temperature of the entire volume of liquid from rising to such a degree as to impair the efficiency of the apparatus.

Consequently, it is impractical to exhaust the output of a relatively large gear pump through a relief valve, and the gear pumps heretofore employed for this purpose did not have sufficient capacity to operate a large motor at high speed.

An object of the invention is to operate a feed motor at both the lowest and the highest practical speeds with a minimum power consumption.

Another object is to operate a hydraulic motor intermittently at the highest practical speed without heating the driving liquid an appreciable amount.

Other objects and advantages will appear hereinafter.

According to the invention in its general aspect, a hydraulic motor is operated at slow speed by a feed pump of limited capacity, a second pump of small capacity is employed for control purposes and/or to supercharge the feed pump, the motor is operated at high speed by a third pump of large capacity, and the output of the large capacity pump is bypassed freely whenever it is not being employed to operate the motor.

A hydraulic transmission embodying the invention is illustrated in the accompanying drawings in which the views are as follows:

Fig. 1 is a schematic drawing showing the invention applied to a turret lathe.

Figs. 2, 3 and 4 are longitudinal sections through the pilot and control valves shown in Fig. 1, but showing the plungers thereof in other characteristic positions.

Fig. 5 is in part a vertical section and in part a front view of a pump unit which may be employed.

Fig. 6 is a sectional plan on a line 6—6 of Fig. 5.

Figs. 5 and 6

The pump unit has a variable displacement pump 1, a small capacity gear pump 2 and a large capacity gear pump 3 arranged in a unitary housing 4 and preferably driven in unison to maintain the same ratio of output at all speeds.

The pumps 1 and 2 chosen for illustration are fully illustrated and described in Patent No. 1,753,562, issued April 8, 1930 to John P. Ferris, and the pump unit shown in Figs. 5 and 6 differs therefrom only in the addition of the large gear pump 3 and a driving chain 5 which engages sprocket wheels 6 and 7 carried, respectively, by the shaft 8 of the pump 3 and the shaft 9 of the pumps 1 and 2. Consequently, only a brief description of the pumps 1 and 2 will be given.

The pump 1 has a circular driver 10 which is fixed upon the inner end of the shaft 9 and substantially surrounds a hub 11 which is arranged upon a pintle 12 and carries the pistons and cylinders. The pintle 12 is supported by an arm 13 which is pivotally supported at its upper end upon a stationary sleeve (not shown) and adapted to be swung laterally by an adjusting lever 14 to vary the eccentricity of the pintle 12 relatively to the axis of the driver 10 and thereby vary the stroke of the pump, as fully disclosed in the patent referred to above.

The shaft 9 is journaled in the front plate 15 of the housing 4 and in a gear pump casing 16 which is carried by the front plate 15 upon the inside thereof and provided in its front face with two pump chambers 17 and 18 which are closed by the front plate 15.

The gear pump 2 is arranged in the pump chamber 17 and has its driving gear 19 fixed upon the shaft 9 and in mesh with a driven gear 20 which is arranged upon a shaft 21 carried by the gear pump casing 16.

The lower part of the housing 4 provides a reservoir from which the gear pump 2 draws liquid through a suction pipe 22 and then discharges into a supply pipe 23 which is connected to the intake of the pump 1 by means of a duct 24 formed in the pintle 12.

The pump 1 is thus supercharged by the gear pump 2, and the output of the pump 1 is discharged into a high pressure supply pipe 25 through a duct 26 which is formed in the pintle 12. The maximum pressure which the pump 1 can develop is determined by a high pressure relief valve 27 which is connected into the pipe 25 and discharges into the pump reservoir.

The gear pump 2, preferably has a larger capacity than the pump 1 and a part of its output is directed through the pipe 23 and into a pipe 28 to be employed for control purposes, the excess liquid delivered by the gear pump 2 being exhausted through a relief valve 29 the resistance of which determines the maximum pressure in the gear pump circuit. This pressure must be sufficient at all times to operate the control devices hereinafter described.

The gear pump 3 is arranged in the chamber 18 and has a driving gear 30 fixed upon the shaft 8 and in mesh with a driven gear 31 which is arranged upon a shaft 32 carried by the front plate 15 and the pump casing 16. When the gears 30 and 31 are rotated, liquid is drawn from the lower part of the housing 4 through a suction pipe 33 and delivered into a discharge pipe 34 in which the maximum pressure is limited by a relief valve 35.

*Figs. 1–4*

The invention is shown applied to a turret lathe having a tool turret 36 which is supported upon the frame or bed 37 of the lathe and adapted to be advanced and retracted thereon by a hydraulic motor which has its cylinder 38 attached to the bed 37 and its piston 39 attached to the turret 36.

Liquid for operating the motor is supplied by the pumps 1 and 3 and delivered to the cylinder 38 through a hydraulically operated control valve 40 which has a plunger 41 arranged in its cylinder 42 for controlling the passage of liquid therethrough.

The valve cylinder 42 has two ports 43 and 44 to both of which the pipe 34 is connected, two ports 45 and 46 arranged between the ports 43 and 44 and connected, respectively, to the front and rear ends of the cylinder 38 by pipes 47 and 48, and a port 49 arranged between the ports 45 and 46 and connected to the supply pipe 25.

When the valve plunger 41 is in its neutral position, as shown in Fig. 1, the liquid delivered by the pumps 1 and 3 into the valve cylinder 42 flows through two ducts 50 and 51 which are formed in the plunger 41 and communicate, respectively, with two discharge chambers 52 and 53 arranged in the ends of the valve cylinder 42. From the chambers 52 and 53, the liquid is returned to the reservoir of the pump through a return pipe 54 which, preferably, is provided with a low pressure resistance valve 55 for keeping the hydraulic circuit flooded at all times.

The valve 40 has two auxiliary cylinders 56 and 57 arranged at the ends of its cylinder 42 and provided, respectively, with bores 58 and 59 in which the stems 60 and 61 of the plunger 41 are fitted and function as pistons therein.

The valve plunger 41 is normally held in its neutral position by two positioning plungers 62 and 63 which abut the ends of the stems 60 and 61 and are urged inwardly by helical compression springs 64 and 65 arranged in spring compartments 66 and 67 formed in the cylinders 56 and 57 respectively.

The plunger 62 has its head arranged in the spring compartment 66 and its stem extended through a partition 68 which separates the spring compartment 66 from the bore 58 and limits the inward movement of the plunger 62.

The plunger 63 has its head arranged in the spring compartment 67 and its stem extended through a partition 69 which separates the spring compartment 67 from the bore 59 and limits the inward movement of the plunger 63.

The spring compartments 66 and 67 are connected at each end to the return pipe 54 to enable the heads of the plungers 62 and 63 to move freely therein and to provide for leakage from the bores 58 and 59.

The cylinder 57 has a cylinder 70 arranged upon its outer end and provided with a piston 71 whose stem extends into the spring compartment 67 to limit the outward movement of the plunger 63 at a definite point in the cycle of operation.

The operation of the valve 40 is controlled by a pilot valve 72 which has two ports 73 and 74 to which the pipe 28 is connected, a port 75 which is connected to the outer end of the bore 58 by a pipe 76, a port 77 which is connected to the outer end of the bore 59 by a pipe 78, a port 79 which is connected to the outer end of the cylinder 70 by a pipe 80, and two ports 81 and 82 to which the return pipe 54 is connected. Both ends of the valve 72 and the inner end of the cylinder 70 are also connected to the return pipe 54.

When the plunger 83 of the pilot valve 72 is in its neutral position, as shown in Fig. 1, the ports 73 and 74 are separated from the other ports by pistons on the plunger 83 and the liquid delivered by the gear pump 2 in excess of the volume required by the pump 1 is exhausted through the relief valve 29.

The pilot valve 72 is operated by a lever 84 which is pivoted upon the frame 1 and has one of its arms connected to the valve plunger 83 by a link 85, another of its arms provided with a handle 86 for starting the machine, and its third arm provided with a cam roller 87 which is urged downwardly by a spring 88 and normally rests upon the inclined faces 89 of a cam 90 carried by the turret 36.

The machine is started by depressing the handle 86 to cause the lever 84 to raise the cam roller 87 above a cam 91 carried by the turret 36 and to move the pilot valve plunger 83 to its starting position, as shown in Fig. 2.

Liquid from the gear pump 2 now flows through the pipe 28 and the port 74 into the valve 72, out of the valve 72 through the port 75 and the pipe 76 into the bore 58 and forces the valve plunger 41 to its rapid traverse forward position and thereby moves the plunger 63 and the piston 71 axially, as shown in Fig. 2.

The port 77 is now in communication with the port 82 and the port 79 is in communication with the port 81. Consequently, the liquid expelled from the bore 59 by the stem 61 may flow through the pipe 78 and the valve 72 to the return pipe 54, and the liquid expelled from the cylinder 70 by the piston 71 may flow through the pipe 80 and the valve 72 to the return pipe 54.

With the control valve plunger 41 in its rapid traverse forward position, the port 46 is in communication with the ports 44 and 49 and the liquid delivered to the control valve 40 from the pumps 1 and 3 flows through the port 46 and the pipe 48 to the rear end of the cylinder 38 and forces the piston 39 forwardly to advance the turret 36 at rapid traverse speed.

The liquid in the forward end of the cylinder 38 is exhausted through the pipe 47, the port 45, the duct 50, the discharge chamber 52 and the return pipe 54.

As the turret 36 moves forwardly, the cam roller 87 is engaged by the cam 91 and supported upon a face 92 thereon which is parallel to the line of movement of the turret 36.

The pilot valve plunger 83 is thus held in its rapid traverse forward position by the face 92 which is of a length corresponding to the distance which the turret 36 is to be advanced at rapid traverse speed.

When the cam roller 87 reaches the end of the face 92, it rides downwardly under the action of the spring 88 upon a face 93 which is also parallel to the line of movement of the turret 36 and of a length corresponding to the distance which the turret is to be advanced at the feeding rate.

As the cam roller moves from the face 92 to the face 93, the lever 84 moves the pilot valve plunger 83 from its rapid traverse forward position to its forward feed position, as shown in Fig. 3.

The port 79 is now in communication with the port 73 and liquid delivered into the valve 72 by the gear pump 2 may now flow into the end of the cylinder 70 through the pipe 80 and force the piston 71 inwardly until it abuts the inner end of the cylinder 70.

When the piston 71 moves inwardly, its stem engages the plunger 63 and, as the piston 71 has a greater cross-sectional area than the stem 60, the valve plunger 41 is moved axially and the liquid in the bore 58 is expelled into the pipe 76 against the gear pump pressure which holds the plunger 41 against further axial movement under the influence of the spring 67.

With the plunger 41 in the position shown in Fig. 3, the ports 46 and 49 remain in communication with each other but communication between the port 46 and the ports 43 and 44 is closed so that the liquid delivered to the valve 40 by the gear pump 3 is bypassed through the same channels as when the plunger 41 was in its neutral position and only the liquid from the pump 1 reaches the rear end of the cylinder 38 to advance the piston 39 and the turret 36 at the feeding rate, the liquid in the forward end of the cylinder 38 being exhausted through the same channels as previously described.

When the turret 36 has been advanced the distance determined by the length of the face 93, the cam 91 passes from beneath the roller 87 and the spring 88 swings the lever 84 until the roller 87 comes to rest upon a face 94 on the cam 90, thereby moving the pilot valve plunger 83 to its rapid traverse reverse position, as shown in Fig. 4.

The port 77 is now in communication with the port 74 and liquid from the gear pump 2 may flow through the pipe 28, the valve 72 and the pipe 78 to the bore 59 and force control valve plunger 41 to its rapid traverse reverse position, the liquid in the bore 58 being exhausted through the pipe 76 and the valve 72 to the return pipe 54.

The ports 43, 45 and 49 are now in communication with each other and the liquid delivered to the valve 40 by both the pump 1 and the pump 3 is directed through the pipe 47 into the forward end of the cylinder 38 to retract the piston 39 and the turret 36 at high speed, the liquid in the rear end of the cylinder 38 being exhausted through the pipe 48, the port 46, the duct 51, the chamber 53 and the return pipe 54.

The face 94 on the cam 90 is parallel to the line of movement of the turret 36 and thus holds the lever 84 against movement until just before the turret 36 reaches the end of its reverse movement and then the roller 87 rides upwardly upon the inclined face 89 and swings the lever 84 until it has moved the pilot valve plunger 83 to its neutral position, thereby interrupting the delivery of liquid from the gear pump 2 to the control valve 40 and enabling the spring 64 and the plunger 62 to return the plunger 41 to its neutral position, as shown in Fig. 1. The machine then comes to rest and the liquid delivered by the gear pump 3 is bypassed freely, as previously described.

A relatively small feed pump may thus be employed to operate a large hydraulic motor, and a relatively small low pressure pump may be employed to operate the control valve and/or to supercharge the feed pump as the rapid traverse pump has sufficient capacity to operate the motor at the desired rapid traverse speed and its output is freely bypassed during its relatively long inactive periods. This avoids the generation of heat and loss of power during the inactive periods of this large pump.

The invention herein set forth is susceptible of various modifications and adaptations without departing from the scope thereof as hereafter claimed.

The invention is hereby claimed as follows:

1. The combination with a hydraulic motor, of a feed pump for supplying liquid to said motor to operate the same at slow speed, an auxiliary pump connected to said feed pump for supercharging the same, a larger auxiliary pump for delivering liquid to said motor to operate the same at high speed, and means for controlling the delivery of liquid to said motor and for bypassing freely the liquid delivered by said large auxiliary pump.

2. The combination with a hydraulic motor, of a variable displacement pump for supplying liquid to said motor to operate the same at slow speed, an auxiliary gear pump connected to said variable displacement pump for supercharging the same, a larger gear pump for delivering liquid to said motor to operate the same at high speed, and means for controlling the delivery of liquid to said motor and for bypassing freely the liquid delivered by said large gear pump.

3. The combination with a hydraulic motor, of a feed pump for supplying liquid to said motor to operate the same at slow speed, an auxiliary pump connected to said feed pump for supercharging the same, a larger auxiliary pump for delivering liquid to said motor to operate the same at high speed, means for controlling the delivery of liquid to said motor and for bypassing freely the liquid delivered by said large auxiliary pump, and a single drive for operating all of said pumps.

4. The combination with a hydraulic motor, of a feed pump for supplying liquid to said motor to operate the same at slow speed, an auxiliary pump connected to said feed pump for supercharging the same, a larger auxiliary pump for delivering liquid to said motor to operate the same at high speed, means for controlling the delivery of liquid to said motor and for bypassing freely the liquid delivered by said large auxiliary pump, and a single casing enclosing all of said pumps.

5. The combination with a hydraulic motor, of a feed pump for supplying liquid to said motor to operate the same at slow speed, an auxiliary pump connected to said feed pump for supercharging the same, a larger auxiliary pump for delivering liquid to said motor to operate the same at high speed, means for controlling the delivery of liquid to said motor and for bypassing freely the liquid delivered by said large auxiliary pump, a single casing enclosing all of said pumps, and a single drive for operating all of said pumps.

6. The combination, with a hydraulic motor, of a small capacity feed pump for delivering liquid to said motor to operate the same at slow speed, a large capacity pump for delivering liquid to said motor to operate the same at high speed, a hydraulically operated valve for controlling the delivery of liquid to said motor and operable to bypass freely the liquid delivered by said large capacity pump, and another pump for delivering liquid to said valve to operate the same.

7. The combination, with a hydraulic motor, of a variable delivery pump for delivering liquid to said motor to operate the same at slow speed, a large gear pump for delivering liquid to said motor to operate the same at high speed, a hydraulically operated valve for controlling the delivery of liquid to said motor and operable to bypass freely the liquid delivered by said large gear pump, and a small gear pump for delivering liquid to said valve to operate the same.

8. The combination, with a hydraulic motor, of a small capacity feed pump for delivering liquid to said motor to operate the same at slow speed, a large capacity pump for delivering liquid to said motor to operate the same at high speed, a hydraulically operated valve for controlling the delivery of liquid to said motor and for bypassing freely the liquid delivered by said large capacity pump, and another pump for supercharging said feed pump and for delivering liquid to said valve to operate the same.

9. The combination, with a hydraulic motor, of a variable delivery feed pump for delivering liquid to said motor to operate the same at slow speed, a large gear pump for delivering liquid to said motor to operate the same at high speed, a hydraulically operated valve for controlling the delivery of liquid to said motor and for bypassing freely the liquid delivered by said large gear pump, and a small gear pump for supercharging said feed pump and for delivering liquid to said valve to operate the same.

10. The combination, with a hydraulic motor, of a small capacity feed pump for delivering liquid to said motor to operate the same at slow speed, a large capacity pump for delivering liquid to said motor to operate the same at high speed, a hydraulically operated valve for controlling the delivery of liquid to said motor and for bypassing freely the liquid delivered by said large capacity pump, another pump for supercharging said feed pump and for delivering liquid to said valve to operate the same, and a single drive for operating all of said pumps.

11. The combination, with a hydraulic motor, of a small capacity feed pump for delivering liquid to said motor to operate the same at slow speed, a large capacity pump for delivering liquid to said motor to operate the same at high speed, a hydraulically operated valve for controlling the delivery of liquid to said motor and for bypassing freely the liquid delivered by said large capacity pump, another pump for supercharging said feed pump and for delivering liquid to said valve to operate the same, and a single casing enclosing all of said pumps.

12. The combination, with a hydraulic motor, of a small capacity feed pump for delivering liquid to said motor to operate the same at slow speed, a large capacity pump for delivering liquid to said motor to operate the same at high speed, a hydraulically operated valve for controlling the delivery of liquid to said motor and for bypassing freely the liquid delivered by said large capacity pump, another pump for supercharging said feed pump and for delivering liquid to said valve to operate the same, a single casing enclosing all of said pumps, and a single drive for operating all of said pumps.

13. The combination, with a hydraulic motor having a piston and a cylinder, of a high pressure pump for supplying liquid to said cylinder to move said piston at slow speed, an auxiliary pump connected to said high pressure pump for supercharging the same, a larger auxiliary pump for supplying liquid to said cylinder to move said piston at high speed, a valve having a port connected to each end of said cylinder, a port connected to the outlet of said high pressure pump and two ports connected to the outlet of said large capacity pump, and means for operating said valve to control the delivery of liquid from said high pressure pump to said cylinder and to either direct the liquid delivered by said large auxiliary pump into said cylinder or to bypass the same freely.

14. A transmission, for a machine tool having a movable carriage, comprising a hydraulic motor for moving said carriage, a high pressure pump for supplying liquid to said motor to operate the same and thereby move said carriage at slow speed, an auxiliary low pressure pump connected to said high pressure pump for supercharging the same, a larger auxiliary pump for supplying liquid to said motor to operate the same and thereby move said carriage at high speed, a hydraulically operated valve for controlling the delivery of liquid to said motor and for bypassing freely the liquid delivered by said large auxiliary pump, and a pilot valve operated in accordance with the movement of said carriage for controlling the operation of said hydraulically operated valve.

15. A transmission, for a machine tool having a movable carriage, comprising a hydraulic motor for moving said carriage, a variable delivery pump for supplying liquid to said motor to operate the same and thereby move said carriage at slow speed, a small gear pump connected to said variable delivery pump for supercharging the same, a large gear pump for supplying liquid to said motor to operate the same and thereby move said carriage at high speed, a hydraulically operated valve for controlling the delivery of liquid to said motor and for bypassing freely the liquid delivered by said large gear pump, and a pilot valve operated in accordance with the movement of said carriage for controlling the operation of said hydraulically operated valve.

16. The combination, with a hydraulic motor, of a small capacity high pressure variable delivery feed pump for supplying liquid to said motor to operate the same at slow speed, a large capacity gear pump for delivering liquid to said motor to operate the same at high speed, a hydraulically operated control valve for directing liquid selectively from said pumps to said motor to operate the same at high or low speed in either direction and for bypassing freely the entire output of said gear pump during slow speed operation of said motor, a small capacity gear pump for supercharging said feed pump and for delivering liquid to said valve to operate the same, and a pilot valve controlling the delivery of liquid from said small gear pump to said control valve and operated by movement created by said motor.

JOHN P. FERRIS.